Feb. 9, 1926.  
G. A. SCHETTLER  
1,571,972  
TENSIONING DEVICE FOR ENDLESS BELT MEMBERS  
Filed Nov. 20, 1923  
2 Sheets-Sheet 1

INVENTOR  
Gustav Adolf Schettler  
By his Attorney,  
Nelson W. Howard

Feb. 9, 1926.                                                                  1,571,972
G. A. SCHETTLER
TENSIONING DEVICE FOR ENDLESS BELT MEMBERS
Filed Nov. 20, 1923          2 Sheets-Sheet 2

INVENTOR
Gustav Adolf Schettler
By his Attorney,
Nelson W. Howard

Patented Feb. 9, 1926.

1,571,972

UNITED STATES PATENT OFFICE.

GUSTAV ADOLF SCHETTLER, OF LEEDS, ENGLAND, ASSIGNOR TO THE TURNER TANNING MACHINERY COMPANY, OF PEABODY, MASSACHUSETTS, A CORPORATION OF MAINE.

TENSIONING DEVICE FOR ENDLESS-BELT MEMBERS.

Application filed November 20, 1923. Serial No. 675,946.

*To all whom it may concern:*

Be it known that I, GUSTAV ADOLF SCHETTLER, a citizen of Germany, residing at Leeds, England, have invented certain Improvements in Tensioning Devices for Endless-Belt Members, of which the following description, in connection with the accompanying drawings, is a specification, like reference characters on the drawings indicating like parts in the several figures.

This invention relates to tensioning devices for endless belt members and is shown as applied to a splitting machine of the type having a belt knife as the cutting element.

Splitting machines of the type referred to comprise characteristically an endless belt knife arranged to pass around two wheels or rollers spaced such a distance apart as to tension the knife between them during the continuous running movement of the knife. In practice it is desirable to slacken the tension of the belt knife when the machine is stopped at the end of any given period of operations. Heretofore, this has been accomplished by manipulation of adjusting screws associated with one of the wheels or rollers, thereby allowing its bearing to slide back along the frame toward the other wheel or roller. In following this method a readjustment of the said wheel or roller is necessitated before the machine can be used again.

It is an object of the present invention to provide, in machines which embody an endless belt member, means for facilitating the operations of slackening the tension of the endless belt and also of restoring the tension, without losing the normal working adjustment of the belt and of the means through which adjustment is secured.

To this end, as illustrated and in accordance with important features of the invention, an endless belt knife splitting machine is provided, in addition to means for securing the normal working adjustment of the belt knife, with means having a plurality of predetermined positions and movable from one to another for causing a belt supporting member to vary the tension on the belt without disturbing the working adjustment thereof. By this arrangement after the belt knife has been adjusted to give the proper working tension and then slackened, upon a reverse operation of the belt slackening means the belt is instantly restored to its proper tension without any manipulation of the adjusting means.

As shown, one of a pair of wheels which support the belt knife is movable, through the operation of a controlling member, from and into a definite working position on a slide which is adjustable in a well-known manner for obtaining the working tension of the knife, the said movement by the controlling member, serving to slacken or to restore the working tension of the knife while the slide remains stationary. Conveniently, the bearing for this wheel is mounted in or on a rotatable eccentric member carried by the slide and operable by a hand lever which may be fastened in a definite position to retain the belt knife under working tension.

Other features of the construction and novel combinations of parts will be described in the detailed specification and pointed out in the appended claims.

Figure 1:
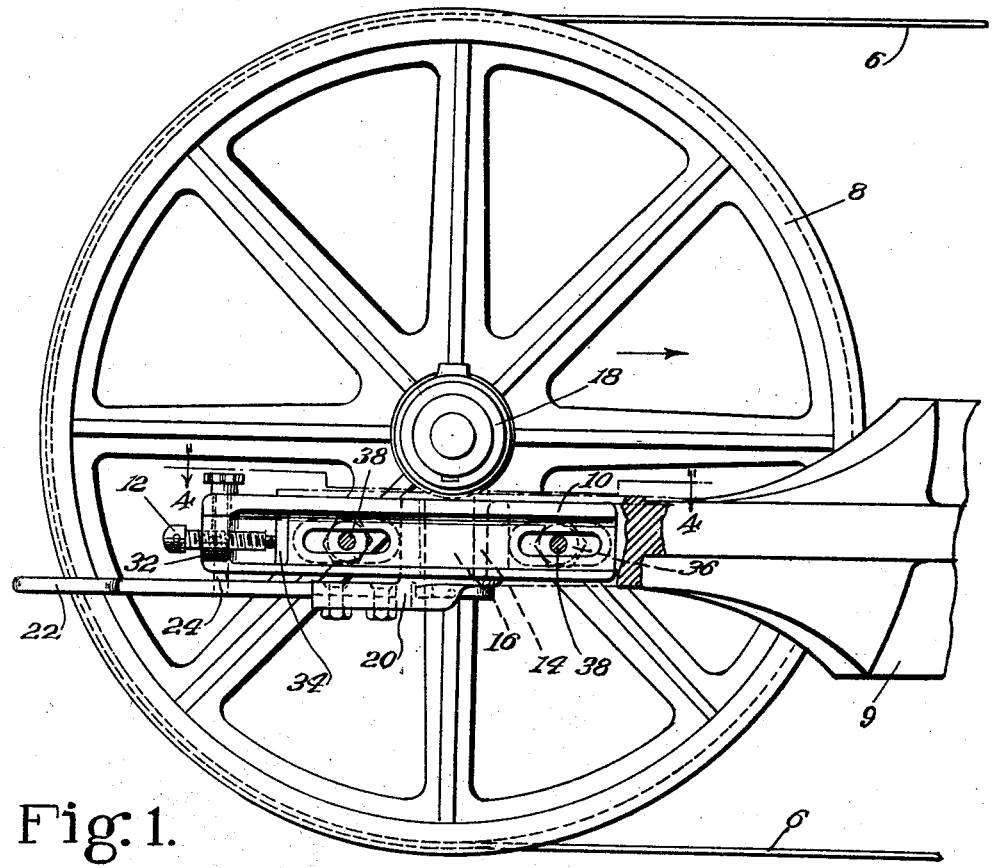
Fig. 1 is a side elevation of one of the wheels of the machine having combined therewith improved means for adjusting the tension of the endless belt knife.
Figure 2:
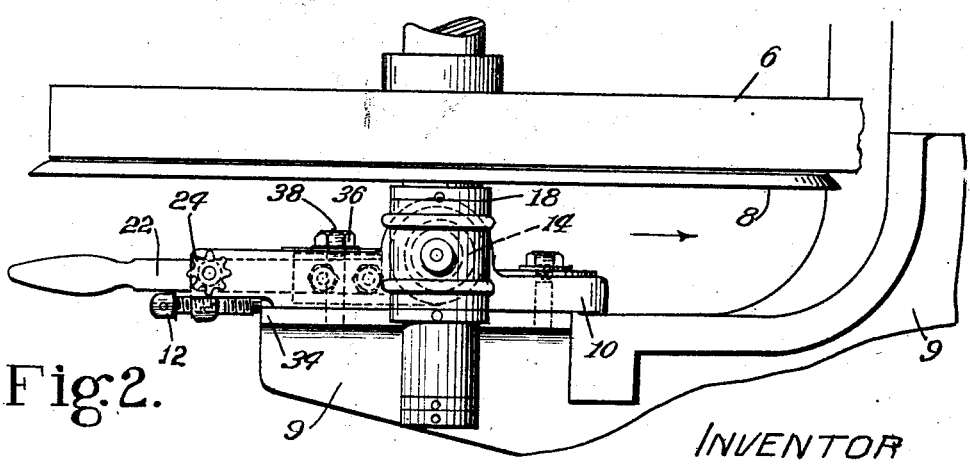
Fig. 2 is a plan view of the parts shown in Fig. 1.

Referring to Figures 1 and 2, a belt knife is indicated at 6, the main carrying wheel of same at 8, and the machine frame at 9, it being understood that the belt knife passes around a second wheel, similar to wheel 8, at the other end of the machine. For a more complete disclosure of the essential elements of a splitting machine of the belt knife type, reference should be had to United States Letters Patent No. 288,551, granted November 13, 1883, upon application of Eustace Cummings.

Figure 3:
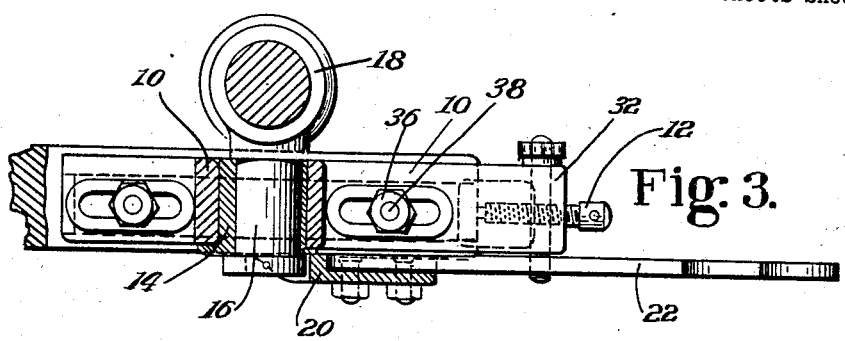
Fig. 3 is a rear elevation, partly in section, of the bearing for the wheel and of the slide which carries the bearing.
Figure 4:
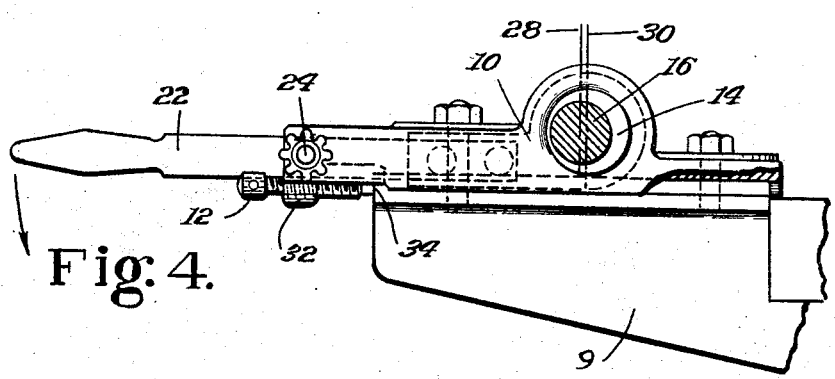
Fig. 4 is a sectional plan view taken along a plane indicated by the line 4—4 in Fig. 1.
Figure 5:
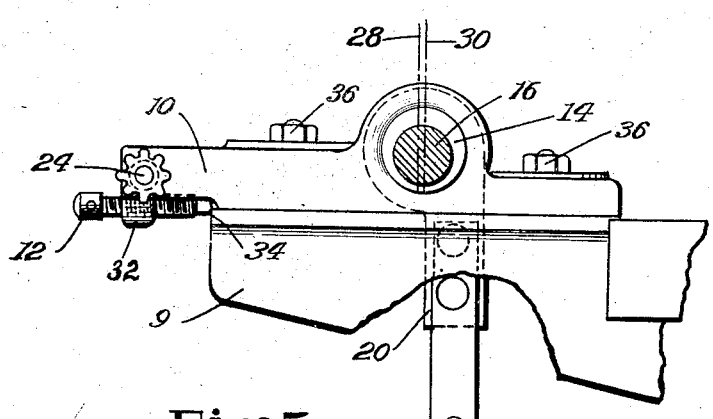
Fig. 5 is a view similar to Fig. 4, showing the parts in a different position.

In the illustrative embodiment of the invention, a slide 10 adjustable on the said frame by a screw 12 carries a rotatable eccentric sleeve 14 (Figures 3 and 4) which carries therein a central pivot 16 of the main wheel bearing 18 and has formed on its lower end an extension 20 to which is rigidly attached a hand lever 22. By means of the hand lever, the eccentric sleeve 14 can be rotated within the slide 10 as will be understood by a comparison between Figures 4 and 5. The hand lever 22 is locked in a working position (Figures 1, 2, 3 and 4) by a pin 24 in the slide 10 the lower end of said pin passing through a hole 26 (Fig. 5) in the hand lever. The pin can be lifted to release the hand lever and when the latter is moved in the direction of the arrow from the working position shown in Figure 4 to that shown in Figure 5 it turns the sleeve 14 which, owing to its eccentricity, moves the pivot 16 of the bearing 18 from the centre 28 (Figure 4) to the centre 30 (Figure 5). Thus there is brought about a bodily movement of the bearing 18 and an angular movement of the wheel 8 in the direction indicated by the arrow in Figures 1 and 2 which movement slackens the tension on the belt knife 6. Movement of the hand lever 22 from the position shown in Figure 5 back to the working position (Figure 4) immediately restores the working tension.

The proper working tension of the belt knife 6 is obtained originally by adjusting the slide 10 by means of the screw 12 while the hand lever 22 occupies the working position.

The screw 12 is carried in a threaded lug 32 on the slide 10 and bears against the adjacent end 34 of the machine frame 9. After adjustment, the slide is fastened in position on the machine frame by nuts 36 on studs or bolts 38.

The arrangement herein described gives the further advantage that the knife cannot be overtensioned to an extent which would cause it to break, for the reason that when the endless knife is abnormally tensioned it is not possible to move the hand lever 22. It then becomes necessary to reduce the tension, by adjustment of the slide 10, until a free motion of the hand lever is possible and when this condition is obtained it indicates that the knife has the correct tension for working.

Having thus described my invention, what I claim as new and desire to secure by Letters Patent of the United States is:—

1. In a mechanism of the character described, an endless belt, a member for supporting the belt, means for adjusting the member in a direction to tension the belt, and means having a plurality of predetermined positions and movable from one to another for causing the member to vary the tension on the belt without disturbing the adjusting means.

2. In a machine of the character described, an endless belt, a roller around which the belt passes, a member for supporting the roller, means for adjusting said member on the frame of the machine in a direction to apply tension to the belt, and means movable from one to the other of two definite positions for causing the roller to move on its supporting member without losing the adjustment secured by the adjusting means.

3. In a machine of the character described, an endless belt, a roller around which the belt passes, a member for supporting the roller, a single screw-threaded member for adjusting said supporting member on the frame of the machine in a manner and in a direction to apply tension on the belt, and an oscillatory cam member for adjusting the roller to one of a number of predetermined positions on its supporting member, thereby to increase or to relax the tension on the belt.

4. In a mechanism of the class described, an endless belt, a roller for supporting the belt, a member upon which the roller is mounted, said roller having a supporting bearing mounted in said member, and a rotatable eccentric member for moving the supporting bearing in directions to slacken or to tighten the belt.

5. In a mechanism of the class described, an endless belt, a roller for supporting the belt, a member upon which the roller is mounted, said roller having a supporting bearing mounted in said member, a rotatable eccentric member for moving the supporting bearing in directions to slacken or to tighten the belt, and a manually operable controller for rotating the eccentric to change the tension of the belt at the will of the operator.

6. In a leather splitting machine, a belt knife, a roller for supporting the belt knife, said roller having a supporting bearing comprising a pivot pin, a member having a socket to receive the pin, an eccentric in the socket and surrounding the pin, and a manually operable controller for rotating the eccentric to change the position of the pin and of the roller with respect to its supporting member, whereby the tension of the belt knife may be readily adjusted.

7. In a leather splitting machine, a belt knife, a wheel for supporting the belt knife, said wheel having a supporting bearing comprising a pivot pin, a member having a socket to receive the pin, an eccentric in the socket and surrounding the pin, a manually operable lever for rotating the eccentric to change the position of the pin and of the wheel with respect to its supporting member, whereby the tension of the belt knife may be readily adjusted, and means for holding the lever in a position to maintain the tension on the belt knife.

8. In a leather splitting machine, a belt knife, a wheel for supporting the belt knife, said wheel having a supporting bearing comprising a pivot pin, a member having a socket to receive the pin, means for adjusting the member on the frame of the machine, an eccentric in the socket and surrounding the pin, and a manually operable lever for rotating the eccentric to change the position of the pin and of the wheel with respect to its supporting member, whereby the tension of the belt knife may be readily adjusted.

9. In a cutting machine, a belt knife cutter, a wheel for supporting the cutter, a member for supporting the wheel, means for adjusting the member to provide for definite unyielding tension of the belt knife cutter, and a controlling member having a plurality of predetermined positions and movable from one to another for causing the wheel to vary the tension of the cutter without affecting the adjustment of the supporting member by said means.

10. In a cutting machine, a belt knife cutter, a wheel around which the belt knife cutter passes, a single screw threaded member for accomplishing adjustment of the wheel to tension the cutter to a definite extent, and a lever and eccentric having a working and an idle position and movable from one to the other for moving the wheel to increase or relax the tension on the cutter without forfeiting the adjustment secured by the screw-threaded member.

In testimony whereof I have signed my name to this specification.

GUSTAV ADOLF SCHETTLER.